United States Patent [19]

Kralowetz et al.

[11] 4,375,670

[45] Mar. 1, 1983

[54] MACHINE TOOL FOR MACHINING CRANKSHAFTS AND CONTROL SYSTEM FOR THE MACHINE TOOL

[75] Inventors: Johanna Kralowetz, Steyr; Manfred Tischler, Haag, both of Austria

[73] Assignee: GFM Gesellschaft fur Fertigungstechnik und Maschinenbau Gesellschaft mbH, Steyr, Austria

[21] Appl. No.: 279,240

[22] Filed: Jul. 1, 1981

Related U.S. Application Data

[63] Continuation-in-part of Ser. No. 89,239, Oct. 29, 1979, abandoned.

[51] Int. Cl.³ .................. C05B 19/415; B23B 5/18
[52] U.S. Cl. ................... 364/474; 51/165.71; 82/9; 318/573; 364/169
[58] Field of Search ............ 364/474, 475, 167–171; 29/6; 82/9, 10, 2.5, 3, 20, 2 B, 1 C; 318/39, 571, 573; 409/80, 132, 193, 197, 199, 200, 203; 408/3, 12; 51/73 GC, 105 SP, 165.71, 289

[56] References Cited

U.S. PATENT DOCUMENTS

| | | | |
|---|---|---|---|
| 2,942,526 | 6/1960 | Maecker | 409/193 |
| 3,880,025 | 4/1975 | Kralowetz et al. | 364/474 X |
| 3,919,614 | 11/1975 | Wespi | 318/571 |
| 4,099,431 | 7/1978 | Kreucher | 82/9 |
| 4,269,551 | 5/1981 | Kralowetz | 82/1 C |
| 4,305,689 | 12/1981 | Yamade et al. | 409/200 X |

FOREIGN PATENT DOCUMENTS 2000610  1/1979  United Kingdom ............... 409/80

Primary Examiner—Joseph F. Ruggiero
Attorney, Agent, or Firm—Kurt Kelman

[57] ABSTRACT

A machine tool and its associated control system has workpiece holding means which are mounted on a frame for rotation about a fixed axis and are adapted to support and to be fixedly connected to a workpiece, such as a crankshaft, centered on that axis. The machine tool further has a tool carriage which is slidably mounted on the frame for displacement in a direction which is transverse to the rotational axis; first drive means which serve to impart angular rotation to the workpiece holding means about the axis; second drive means which serve to displace the tool carriage in the transverse direction; and electronic control means for controlling the first and second drive means so that the desired angular rotation and transverse displacement are performed with a predetermined, generally nonlinear relationship to each other. The electronic control means include a first controller operatively connected to the first drive means causing it to impart a desired angular rotation to the workpiece holding means; a second controller operatively connected to the second drive means and adapted to control the transverse displacement; and means for determining points of inflection and characteristic values defining a series of linear approximations of the generally nonlinear relationship, and interpolating means operable to provide reference inputs to the two controllers.

7 Claims, 10 Drawing Figures

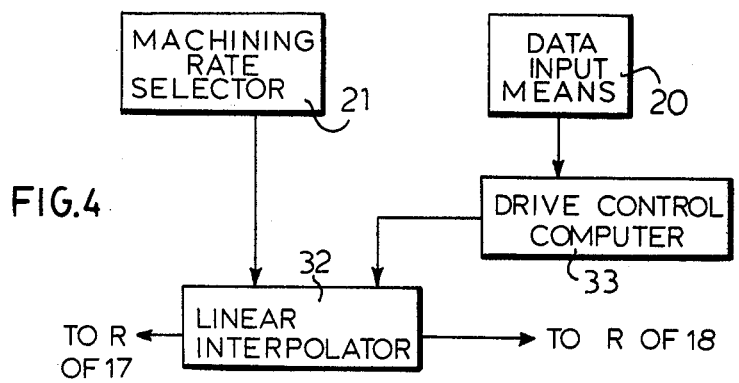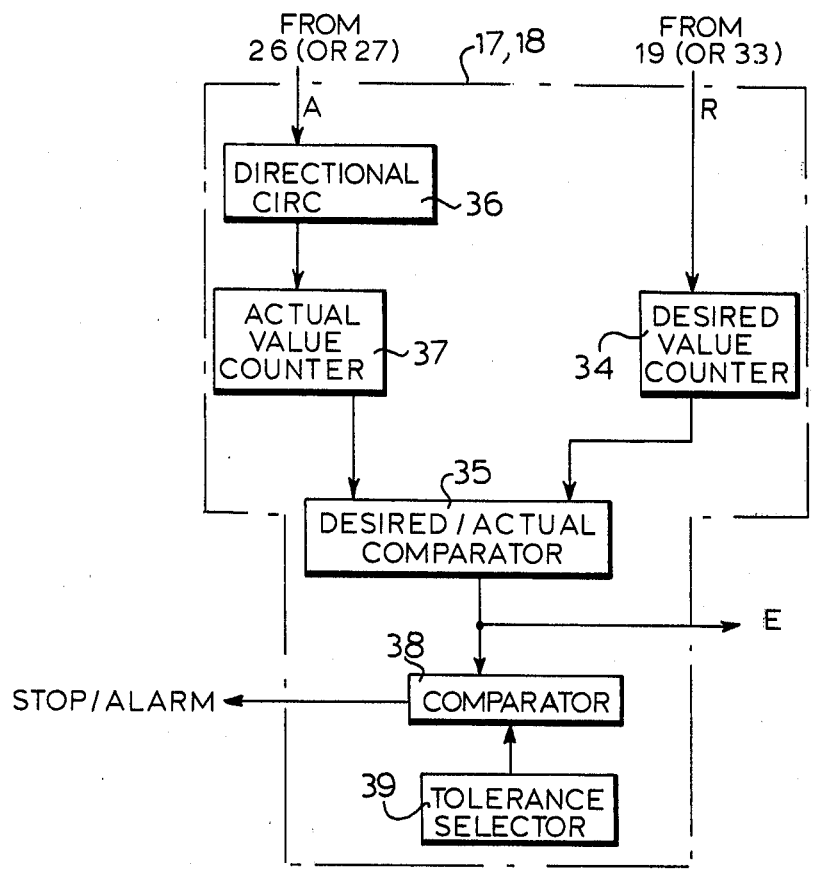
FIG.4
FIG.5

| $X_\alpha$ - MEMORY | | REMARK |
|---|---|---|
| MEM. ADRESS (REG. F) | CONTENTS | |
| 00 | $X_\alpha 0$ | X-Position for ∡ $\alpha$ = 0° |
| 01 | $X_\alpha 1$ | |
| 02 | $X_\alpha 2$ | |
| 03 | $X_\alpha 3$ | |
| ⋮ | ⋮ | |
| 180 | $X_\alpha 180$ | X-Position for ∡ $\alpha$ = 180° |

MACHINE TOOL FOR MACHINING CRANKSHAFTS AND CONTROL SYSTEM FOR THE MACHINE TOOL

The present application is a Continuation-In-Part of pending prior application Ser. No. 089,239 filed Oct. 29, 1979, abandoned.

TECHNICAL FIELD

The present invention relates to a machine tool and its associated controller which are used for precisely milling or grinding crankshafts. The system comprises drive means for rotating the crankshaft about its axis; a tool carriage which is controllably moved transversely to the crankshaft axis; and two separate drive channels which are controlled by an electronic controller in dependence on the angular position of the crankshaft.

BACKGROUND ART

In known prior art systems, the controller for the means for displacing the tool carriage is controlled by a memory in which the displacements of the tool carriage associated with each increment of angular movement of the crankshaft are stored, and the movement imparted to the tool by the tool carriage in dependence on the reference inputs and on the rotation of the workpiece result in combination in a machining of the contoured surface. Known control systems of that kind have the disadvantage that the data for the displacement of the tool carriage in dependence on the angular movement of the crankshaft, which data depend on data relating to the workpiece, must be computed and stored. A decisive other disadvantage resides in that any variations of the actual angular movement of the crankshaft will directly influence the drive means for the tool carriage because the angular position data are derived from the rotating crankshaft by a pulse generator. As a result, the inevitable vibrations and rotational oscillations of the crankshaft being milled influence the translational movement of the tool carriage and may even be amplified as they are transmitted. Owing to this virtually rigid coupling between the drive means for rotating the crankshaft and the drive means for displacing the tool carriage, the tolerance with which the crankshafts can be machined cannot be decreased as much as would be desired. This causes a significant barrier to the degree of precision which may be obtained in crankshaft milling using those approaches.

DISCLOSURE OF INVENTION

It is therefore a primary object of the present invention to provide an improved control system and machine tool for milling or grinding crankshafts such that the perturbations imparted by the tool to the crankshaft will not disturb the control of the tool carriage thereby increasing the milling or grinding precision obtainable.

It is a further object of the present invention to provide an improved machine tool system wherein the increased precision milling or grinding can be adapted to different workpieces and tools by an input of specific but changeable data which reflect such workpiece/tool differences.

These objects are accomplished according to the present invention via separate controllers provided for the drive means for rotating the crankshaft, and for the drive means for displacing the tool carriage, both controllers being controlled by common linear interpolating means connected to electronic control means which is fed with workpiece and tool data.

These objects are further accomplished via the electronic control means determining and providing data representing points of inflection and characteristic values which define a series of linear approximations of the generally nonlinear relationship between the angular rotation of the crankshaft and the transverse displacement of the tool carriage.

As a result of the approach according to the present invention, a reference input is applied via interpolating means to the controller for the drive means for rotating the crankshaft, and to the controller for the drive means for displacing the tool carriage so that irregularities of one movement cannot influence the other movement, largely because the actual movement of the particular member driven by one drive means is not relied upon in controlling the other drive means. The linear interpolating means are connected to drive control computing means and control the two controllers in accordance with the points of inflection determined by the drive control computing means. Therefore, the predetermined relationship between the movement of the carriage and the increments of the desired angular rotation of the crankshaft is maintained. That relationship depends on the geometrical configuration of that crankshaft portion which is being machined. A series of linear approximations is derived from the generally nonlinear relationship between the angular rotation of the crankshaft and the transverse displacement of the carriage. The drive control computing means provide data which represent the points of inflection which are required to ensure that the machining will be effected within a predetermined tolerance range, and the factors of proportionality which are changed at those points of inflection. The drive control computing means calculate the points of inflection and the factors of proportionality in accordance with a predetermined program from input data relating to the workpiece and tool.

Also, according to the present invention, a separate linear interpolator is clock-controlled at the rate required to ensure a desired machining rate. The expenditure involved in a separate linear interpolator can be avoided if, in accordance with a further preferred feature of the invention, the drive control computing means and the linear interpolating means are combined in a central computer, which in accordance with a fixed program delivers control pulses and direction signals at a clock frequency determined by the program. Because that central computer delivers control pulses rather than only the results of arithmetic operations, expensive separate interpolators, which cannot be adjusted, are no longer required. When such a central computer is used as a control unit, the control pulses must not be delivered at a frequency which depends on the computing rate but must be delivered at a predetermined rate. In accordance with its program, the computer then selects the required frequency from a plurality of frequencies, which determine respective machining rates.

BRIEF DESCRIPTION OF DRAWINGS

Additional objects and advantages of the invention will become apparent to those skilled in the art as the description proceeds with reference to the accompanying drawings, in which:

FIG. 4 is a block diagram illustrating alternate means for controlling the two controllers for the drive means for the crankshaft and the drive means for the tool carriage;

FIG. 5 is a detailed block diagram of a controller; and

BEST MODE OF CARRYING OUT THE INVENTION

Figure 1:
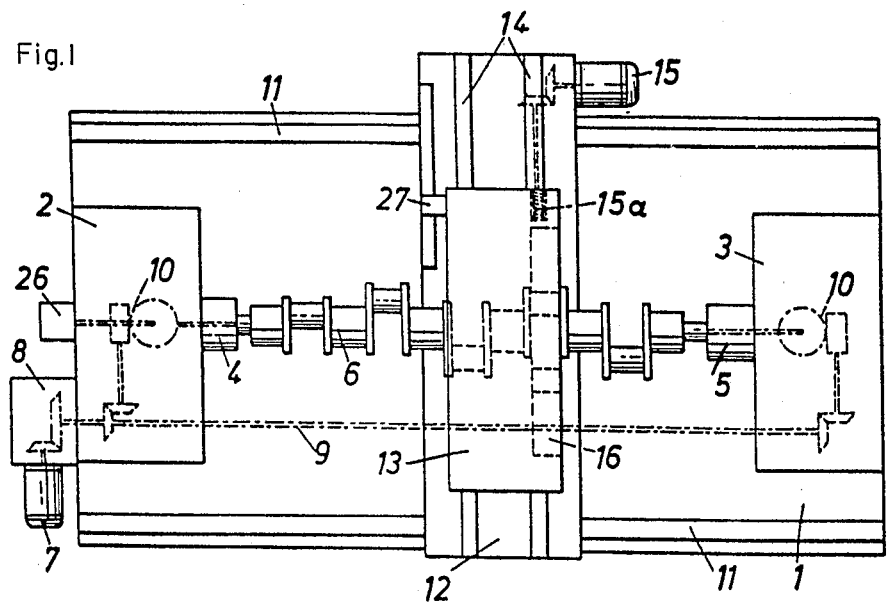
FIG. 1 is a top plan view showing a machine tool embodying the present invention.

Referring now to FIG. 1, there is shown a top plan view of the crankshaft milling/grinding machine tool which comprises a frame 1 having end brackets 2 and 3 in which workpiece holders 4 and 5, for the crankshaft 6 to be machined, are mounted. The holders 4 and 5 are adapted to be driven by a motor 7, which drives via a transmission 8 a main drive shaft 9, from which the drive of the workpiece holders 4 and 5 is derived via respective worm gear trains 10. The frame 1 further has a pair of rails 11, which are parallel to the axis of the crankshaft 6, and on which a guide carriage 12 is slidably mounted. A tool carriage 13 is carried by the guide carriage 12 and, on a pair of guide rails 14 of the carriage 12, is movable by means of a motor 15 and a power screw 15a transversely to the rotational axis of the crankshaft 6. The transverse displacement of the tool carriage 13, as shown by the horizontal displacement arrow "X" of FIG. 2, and the rotation of the crankshaft 6, as shown by the rotation arrow "α" of FIG. 2, can be coordinated so that a revolving milling cutter 16 is moved, e.g., around a particular crankpin so as to machine a contoured surface thereon.

Figure 3:
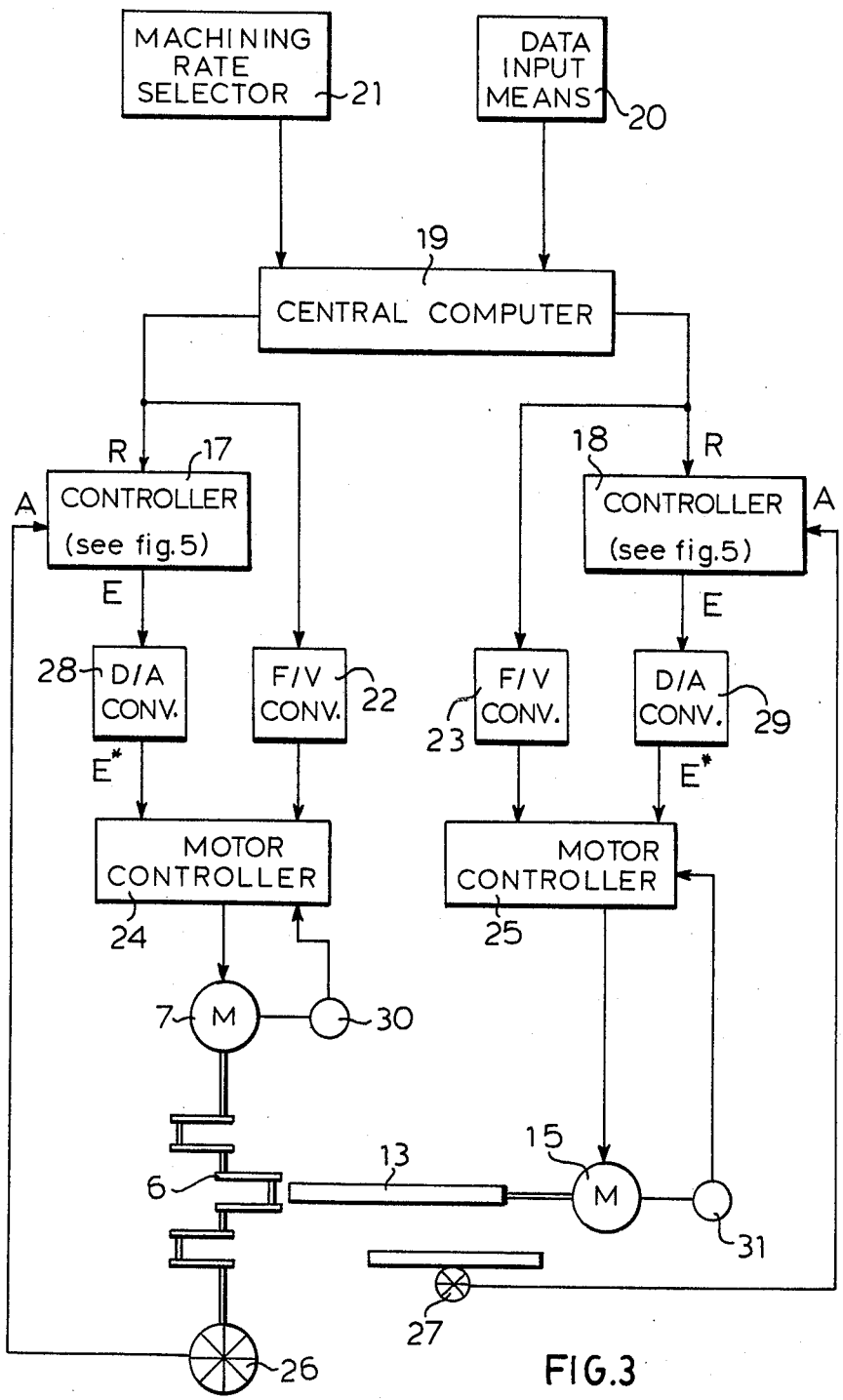
FIG. 3 is a block diagram showing the control system according to the invention for the machine tool of FIGS. 1 and 2.

As is well-known in the machine tool design arts, kinematic and/or graphic relationships are conventionally used to describe the nonlinear motions carried out by various types of tools on the range of workpieces. This is particularly so when the machining being done involves compound motion, and/or when the workpiece is being machined into other than very simple contours. As an illustrative prior art teaching of a compound machining device, the interested reader is referred to U.S. Pat. No. 3,880,025 assigned to the same assignee as the present invention. FIGS. 3–5 of that patent show, respectively, the milling of crankshafts having two different circular diameters, and one of ellipsoid cross section.

Figure 2:
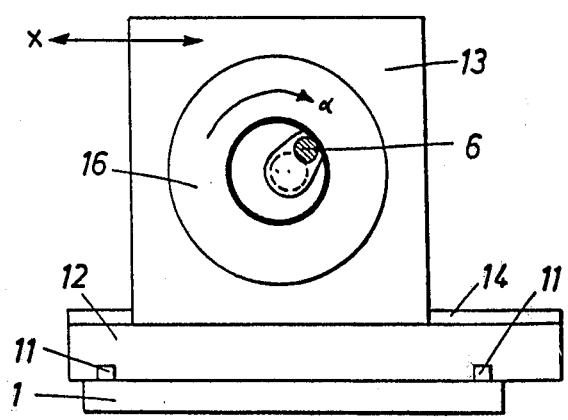
FIG. 2 is a diagrammatic side elevation showing the tool carriage of machine tool.

Turning to the present machine tool of FIGS. 1 and 2, we note that a crankpin of crankshaft 6 may be machined by rotating the crankshaft rather than turning the revolving cutter 16, or the like, about the crankpin. However, since the crankpins are eccentric in relation to the supports of the crankshaft, the crankpins move along a circular path during turning of the shaft. To machine the crankpins, the cutter must be reciprocated correspondingly to the movement of the crankpin during the rotation of the crankshaft, the displacement of the slide for the cutter depending on the rotational position of the crankshaft and, thus, on the position of the crankpin. Therefore, a certain displacement of the cutter slide is associated with each rotational angle of the crankshaft. Mathematically, this dependence of displacement path X of slide 13 on rotational angle α of the crankshaft may be expressed as function X=f(α). For a revolving internal cutter, and a rotating crankshaft, we note the nonlinear relationship to be (for the displacement path X of tool carriage 13 on rotation angle α of the crankshaft 6):

$$X = [(R_F + R_Z)^2 - (R_H \sin \alpha)^2]^{\frac{1}{2}} + R_H \cos \alpha$$

where
X = displacement path of tool carriage 13
α = rotation angle of the crankshaft
$R_F$ = the radius of the milling cutter
$R_Z$ = the radius of the crankpin to be machined
$R_H$ = the radius of the revolving path of the crankpin.

Referring now to FIG. 3, the motors 7 and 15 are shown as controlled respectively by controllers 17 and 18, which are preceded by a central computer 19. Detailed steps of the various compute/store/execute processes carried out by the computer 19 are provided in connection with the flow charts of FIGS. 6–9. For present purposes, a description based on the block diagrams of FIGS. 3–5 is sufficient to impart an overview of the operation of the electronic control means employed. Workpiece and tool data are read into the central computer 19 by a data input means 20. The data input means 20 may correspond to any of the well-known means for inputting tool and workpiece data into conventional numerically controlled machine tools. Illustratively, the interested reader is referred to the teaching of such devices in U.S. Pat. No. 3,969,615 to Bowers et al, which shows and describes a tape reader as element 43 of FIG. 3 therein; used to input part-descriptive data via a punched tape for subsequent lathe control. A similar teaching is presented in U.S. Pat. No. 3,517,286 to Stobbe in the form of elements 62 and 64 of FIG. 2 therein. Based on this input data, the central computer 19, in accordance with its fixed program, computes points of inflection which define a series of linear approximations of the nonlinear relationship between the angular rotation of the crankshaft 6 and the transverse displacement of the tool carriage 13, and the factors of proportionality which change at these points of inflection, and stores the data thus computed. In accordance with the data thus computed, the central computer 19 delivers control pulses as reference inputs to the R-inputs of controllers 17 and 18 at the ratio which is required to ensure that the tool is moved around the workpiece so as to form the desired contoured surface thereon. In accordance with its program, the central computer 19 selects the control pulse output rate in dependence on the setting of a machining rate selector 21. These control pulses are applied not only to the R-inputs of controllers 17 and 18, but also to inputs of a pair of frequency-voltage converters 22 and 23, which deliver corresponding reference input voltages respectively to the first inputs of motor controllers 24 and 25. As a result, the motors 7 and 15 are controlled in dependence on the required relationship between each increment of the angular rotation of the crankshaft 6 and the transverse displacement of the tool carriage 13. Data representing these two movements are individually delivered from a pair of pick-ups, 26 and 27, such as pulse generators, to the A-inputs of the controllers 17 and 18, respectively, and are compared in the latter with the reference input delivered by the R-inputs of the central computer 19. In the event of a deviation of predetermined value, an error signal "ε" is produced and is converted in a digital-analog converter 28 and 29 into a correction voltage, which is applied as the signal "ϵ*" to second inputs of the motor controllers 24 and 25. The accuracy of the machine tool control can be further increased by a comparison of the desired and actual speeds of each motor. For this purpose, a part of suitable tachometers 30 and 31 are connected to the motors 7 and 15, respectively.

FIG. 5 shows in a detailed block diagram the basic arrangement of one of the two substantially identical controllers 17 and 18. The control pulses delivered by the central computer 19 (or the interpolator 32) are applied via the R-input to a desired-value counter 34, which is connected to a first input of a desired value-actual value comparator 35. The actual value signals are applied via the A-input of controller 17 or 18 from pick-ups 26 or 27 and are applied therein through a pulse directional circuit 36 and then to an actual-value counter 37. The output from the actual value counter 37 is connected to a second input of the desired value-actual value comparator 35. The motor controller 24 or 25 (of FIG. 3) can then be controlled in response to the error signal "ϵ" delivered by the desired value-actual value comparator 35. In this way, the error can be restricted to a desired tolerance range. For this purpose, the output signal of the desired value-actual value comparator can be applied to a comparator 38 in which the error signal representing the difference between the desired and actual values is compared with a tolerance value set by the tolerance selector 39. If the difference between the desired and actual values exceeds the preset tolerance in spite of continuous automatic control of the two drive means (e.g., because the drive means respond too slowly or owing to mechanical obstructions), the comparator 38 will deliver a "stop/alarm" signal to the central computer 19 (illustratively) which causes the operation to be stopped and the trouble to be indicated. When this occurs, the machining operation cannot be resumed until the cause of the trouble has been eliminated, and the control means have been suitably reset.

In accordance with the block diagram of FIG. 4, the controllers 17 and 18 for the motor controllers 24 and 25 may alternately be controlled by a separate linear interpolator 32. As shown, the linear interpolator 32 is supplied from a drive control computer 33 with data indicating the required points of inflection and the linear relationship between the increments of the angular rotation of the crankshaft 6 and the transverse displacement of the tool carriage 13. The linear relationship is changed at said points of inflection. For each increment of angular rotation, the drive control computer 33 computes the corresponding displacement for the tool carriage 13 and delivers data corresponding to the ratio of said movements to the interpolator 32, which delivers control pulses to the R-inputs of controllers 17 and 18 in accordance with said ratio. As a result, the drive control computer 33 has time for computing and storing new data until the next point of inflection has been reached. The interpolator 32 must be clock-controlled at a rate determined by the machining rate selector 21 so that the desired machining rate is maintained.

Figures 6A, 6B:
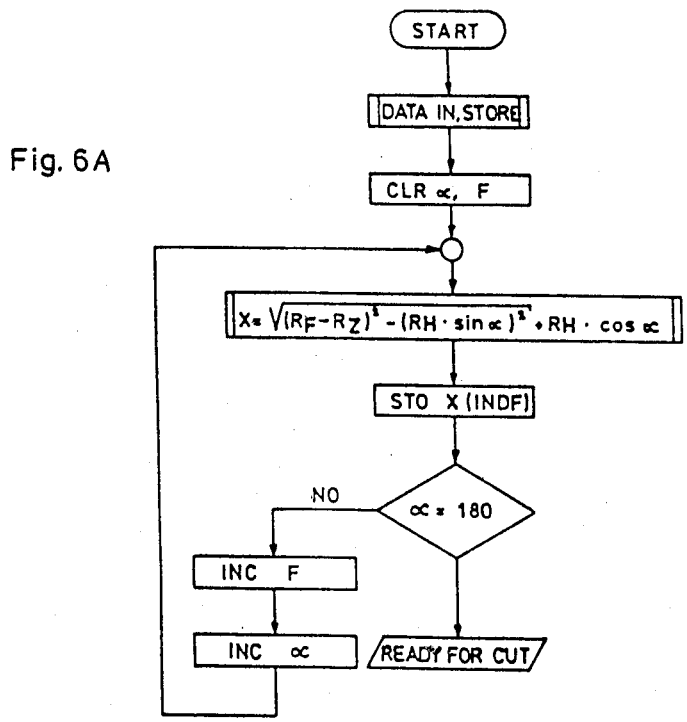
FIGS. 6–9 are process flow charts detailing the various intermediate steps carried out by the electronic control means of the present invention.

Referring now to the flow chart of FIGS. 6A & 6B, the steps needed to implement the desired precise control of the two primary motions for the crankshaft milling machine are outlined. These two motions are the transverse displacement X of the tool carriage 13, and angular rotation α of the crankshaft 6. After initialization of the control electronics including the central computer 19, and the two drive channels containing the controllers 17 and 18, and so forth, [START]; data descriptive of the tool and workpiece parameters are read into the system [DATA IN, STORE]. These data are the aforementioned radius of the milling cutting tool $R_F$, the radius of the crankpin $R_Z$, the radius of the circumscribing path $R_H$ of the crankpin, and the respective speed changes or path information for the speed changes. After this basic data has been entered and stored in suitable registers within the central computer 19, or the drive control computer 33, registers for the crankshaft rotary angle α, and the tool displacement path X, (where X is everywhere defined as a function of α) are cleared, i.e., set to zero [CLR α, F]. The displacement path X for the individual angles is then computed from stored data as support points, as is detailed more clearly in the subroutine of flow chart of FIG. 9. Since registers α and F were initially set to zero, value $X_{α0}$ (for the angle α=0°), is computed in a first step and is stored in a designated memory location; the value $X_{α0}$ being placed at memory point 00 by the address of register F; [STO X (INDIRECT F)]. It is then determined whether angle α has reached the value of 180° [α=180]. If this angle has not yet been reached, 1 is added to the register result of register F and α [INCREMENT F], [INCREMENT α] so that the value $X_{α1}$ for the rotary angle α=1° may be computed in a loop and stored. This is repeated until value $X_{α180}$ for the rotary angle α=180° has been computed and stored. In this manner, all support points for the control of the drive motor 7 for the crankshaft 6, and of drive motor 15 for the tool carriage 13 are stored because mirror-symmetrical conditions prevail due to the circular symmetry for the angular range of 181° to 360°. At that point, the process steps are indicates as [READY FOR CUT].

Figure 7:
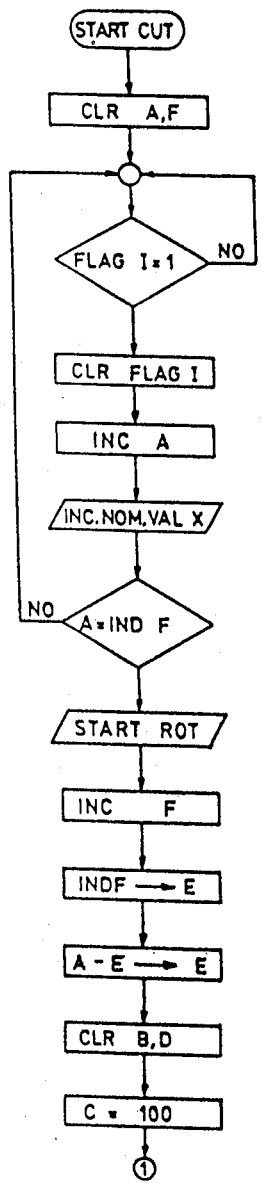
Figure 8:
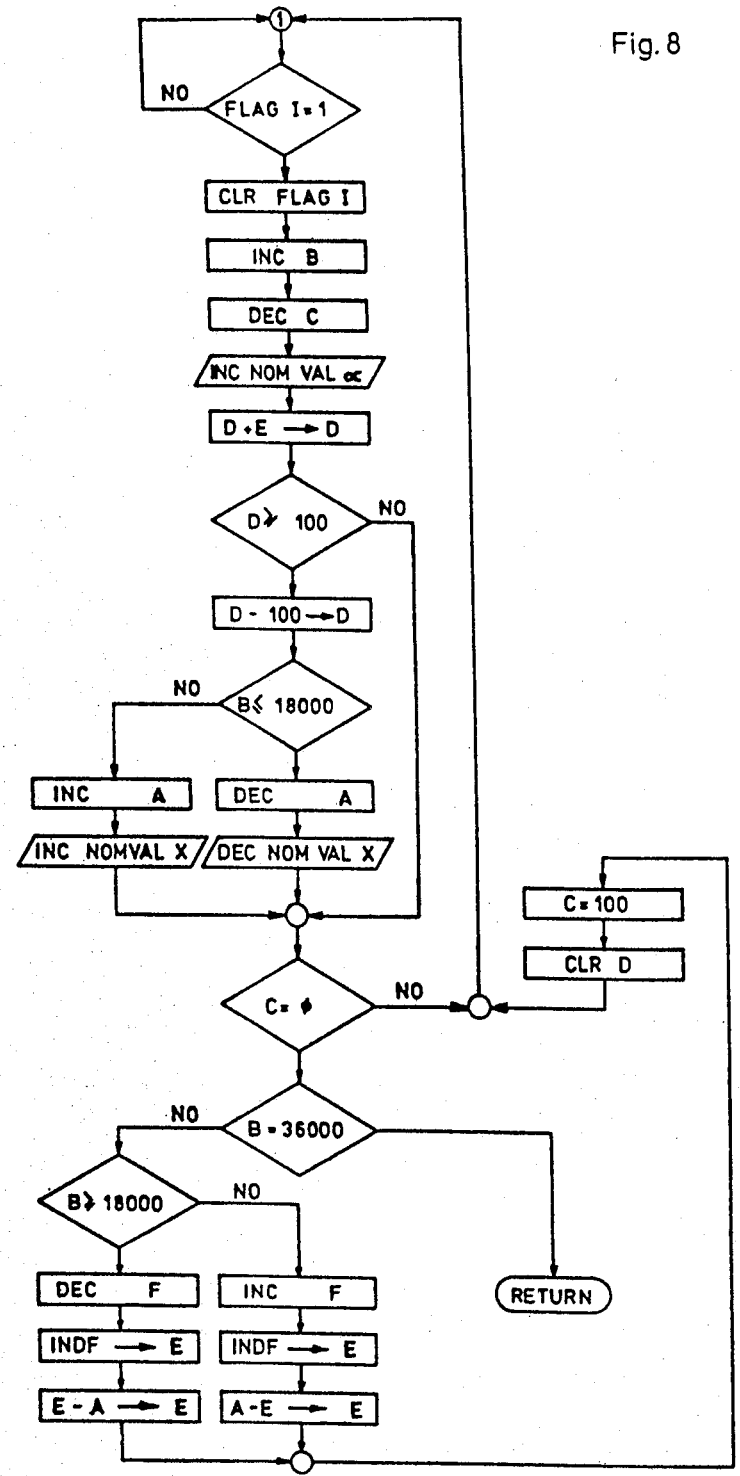

According to the flow chart of FIG. 7, when the actual work begins [START CUT], an auxiliary register A for the value X and the register F are first cleared [CLR A,F] before the program may proceed via a speed datum means (described as the machining rate selector of element 21 of FIG. 3) by means of a flagging unit. The speed datum means provides pulses of a predetermined frequency for the flagging unit. The flagging unit starts the further program action only when a pulse is put in [FLAG I=1] so that the output of control signals does not depend on the speed of computation of the central computer 19 but depends on the predetermined pulse frequency of the speed datum means 21. When the flagging unit has received a pulse, the flag unit is again set at zero and the register position of register A is increased by 1 [INC A], which means a register count of 1 since the register has previously been set to zero. To simplify the conditions, it is assumed in the following that the interpolation of 1° of angle α, and of 1 mm of the transverse displacement path X are divided into 100 parts so that one interpolation step amounts to 0.01° and 0.01 mm.

Therefore, in register A the register position 1 means a displacement path X−0.01 mm. This value is put out as desired value [INCREMENT NOMINAL VALUE X] and, at the same time, it is determined whether register position A conforms to value $X_{α0}$, for angle α=0° [A=IND F]. When value $X_{α0}$ has not yet been reached, a further interpolation step is taken in a loop but only if it can proceed through the flagging unit via speed datum means 21.

When register position A conforms with value $X_α$ precalculated in the memory under address 00 (register F) stored value $X_{\alpha 0}$, the signal for the drive of the workpiece [START ROT] may be given. As a result of the starting signal, register F is set from 00 to 01 and value $X_{\alpha 1}$ stored under address 01 is put into working register E; [INDF→E]. Afterwards, the path difference $X_{\alpha 0} - X_{\alpha 1}$ is formed by subtracting the register positions of registers A and E, and the result is put in register E; [A−E→E]. This path difference at a rotary angle of 1° is needed to divide the interpolation steps in the X-axis uniformly over the 100 rotary steps of the crankshaft at a rotary angle of 1°. To secure such a division, an auxiliary register D is required, in which the computed path difference is summed after each interpolation step and each obtained register position is compared with that of the predetermined number of rotary steps between two angle support points so that an advancement step for the tool carriage may be secured after the same number of rotary steps. It is assumed here that the required number of steps in the X-axis does not exceed the required number of rotary steps between two support points.

A register B for counting the angle steps and a register C for determining the rotary distance of 1° are additionally needed for controlling the rotary drive for the crankshaft and to maintain the division of each angle degree in 100 parts, the register C preferably counting from 100 towards 0. Before the individual rotary steps may be carried out by the rotary drive, registers B and D must be set at zero [CLR B,D]; and register C at 100 [C=100] to obtain the defined starting values. Further program operation is illustrated in the flow chart of FIG. 8. The drive speed for the rotary drive of the crankshaft is predetermined in like manner as the advancement speed for tool carriage 13 from external means via a stepping frequency for a flag unit [FLAG I=1], which enables the program to proceed only when a pulse is put in. After the program can proceed, the flag unit is immediately reset to zero [CLR FLAG I] so as to be ready to receive the next stepping pulse. Afterwards, the register B [INCREMENT B] is reset by increasing the counter by 1 and the register C [DECREMENT C] is reset by decreasing the counter by 1 so that the desired value $\alpha = 0.01°$ may be delivered to the drive for the crankshaft.

To examine whether a drive step is also required for the tool carriage 13, the register accumulations of registers D and E are summed up and the resultant register contents is put in register D. Since the register D has been set at zero before the first rotary step, the register D will now display path difference $X_{\alpha 0} - X_{\alpha 1}$. This path difference to be traversed for rotary angle 0° to 1° by the tool carriage 13 should be as uniform as possible in relation to the 100 rotary steps of 0° to 1° divided into 0.01 mm steps. For this purpose, the register position of register D is examined and compared with value 100 [D≧100]. If it is smaller than 100, FIG. 8 indicates that it is examined whether register C is at zero. Register C=0 would mean that 100 rotary steps of 0.01° had been performed and a new angle range (namely from $\alpha_1 = 1°$ to $\alpha_2 = 2°$) has started. The register position C is, beginning at 100, reduced by 1 at each interpolation step.

As long as register C has not reached the value of 9, a new rotary step of 0.01° is carried out in a loop, dependent on the speed datum put in by the pulse frequency. The described program is now repeated until the path differences summed up in register D have reached a value of 100. If D≧100, register D is first reduced by 100 [D−100→D] and examined where register B, which indicates the obtained angle, is ≦18000, which corresponds to an angle of 180° in the assumed degree division in 100 parts. Since the computed and stored values X for 181° correspond to those of $\alpha = 179°$, etc., the same value may be used. Therefore, beginning with an angle of 180°, register A, which indicates the X-value, must be reduced by 1. If angle $\alpha \leq 180°$, register A is increased by 1 [INC A] and the corresponding nominal value X is put out for control of the tool carriage 13.

When register C is at zero [C=], i.e. at a rotary angle of $\alpha = 1°$, no loop is formed any more but the program is continued, with an examination whether register B has reached 36000 [B=36000], which indicates the termination of the work on the crankshaft. If the work has not yet been finished, register B is asked whether it is larger/equal to 18000 [B≧18000] and the register F is increased by 1 [INC F] or decreased by 1 [DEC F]. With the thus obtained new address for the memory of $X_\alpha$-values, the new support points $(X_{\alpha 2})$ are given to the next interpolation section [IND F→E], and the path difference for the new section is formed [A−E→E] and [E−A→E]. Thereupon the register C must be set at 100 again and register D must be cancelled to enable the rotary drive for the crankshaft to be controlled from $\alpha = 1°$ to $\alpha = 2°$ and that of the tool carriage drive to be controlled from $X_{\alpha 1}$ to $X_{\alpha 2}$, the described program being repeated until the crankshaft has been completely worked. After a full rotation of the workpiece [register B=36000], the installation returns to its initial position [RETURN].

Figure 9:
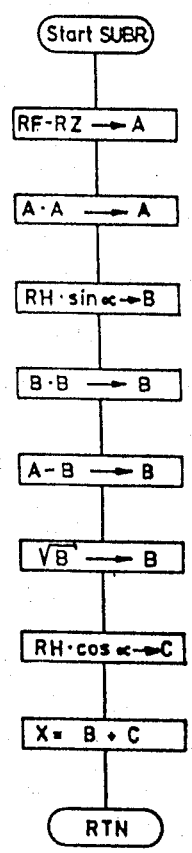

The flow chart of FIG. 9 illustrates the subroutine for computing the X-values. After the start [START SUBR], the difference between machine tool radius and crankpin radius $R_F - R_Z$ is formed and put in register A; [RF−RZ→A]. According to the computing formula, register A is then multiplied by itself and again put in register A; [A·A→A]. In a similar manner, register B receives the product $R_H \cdot \sin \alpha$, [RH·sin α→B]; the register is brought to the second power [B·B→B] and this is again put in register B. The difference between register A and B is then put in register B [A−B→B] and the square root thereof appears at register B; [√B→B]. To this is added register C, which has the product $R_H \cdot \cos \alpha$, [X=B+C] to obtain each value $X_\alpha$ which is then stored under a corresponding address. Thereafter [RETURN].

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. A machine tool for machining crankshafts, comprising:
   (a) a frame having a fixed longitudinal axis;
   (b) workpiece holding means mounted in said frame for rotation about said axis and adapted to support and to be non-rotatably connected to a crankshaft centered on said axis;
   (c) a tool carriage slidably mounted on said frame for a displacement which is transverse to said axis;
   (d) first drive means for imparting an angular rotation to said workpiece holding means about said axis, (e) second drive means for displacing said tool carriage in said transverse direction;
(f) control means for controlling said first and second drive means such that said angular rotation and said transverse displacement are each performed in a predetermined nonlinear relationship in response to independent control signals applied via mutually non-interactive drive channels; said control means comprising:
  (i) a first controller operatively connected to said first drive means for imparting a desired angular rotation to said workpiece holding means in response to an independently controlled rotation signal;
  (ii) a second controller operatively connected to said second drive means for imparting a desired transverse displacement to said tool carriage in response to an independently controlled displacement signal;
  (iii) a drive control computer for processing workpiece and tool data and for computing from said data a plurality of points of inflection and characteristic values defining a series of linear approximations of said predetermined nonlinear relationship, and for providing said independently controlled rotation and displacement signals corresponding to said approximations.

2. A machine tool as set forth in claim 1, which constitutes a milling machine, and further comprising a rotary tool carried by said tool carrier for machining said crankshaft.

3. A machine tool as set forth in claim 1, which constitutes a grinding machine, and further comprising a rotary tool carried by said tool carrier for machining said crankshaft.

4. A machine tool as set forth in claim 1, further comprising:
  interpolating means operable to receive said approximations and to apply reference inputs to said first and second controllers in dependence on said approximations and thus to control said angular rotation and said transverse displacement in accordance with said approximations;
  wherein said drive control computer and said interpolating means are combined in a central computer having a fixed program and operable at a clock frequency determined by said program and in accordance with said program delivers said reference inputs, each of which consists of an independent set of direction signals and control pulses, said sets of control pulses being related to each other in accordance with successive factors of proportionality for said series of linear approximations; and
  said first and second controllers are arranged to receive said direction signals and control pulses and to control said first and second drive means so that said angular rotation and transverse displacement are effected in the directions indicated by said direction signals and with successive factors of proportionality determined by said control pulses.

5. A machine tool for machining crankshafts, comprising:
  (a) a frame having a fixed longitudinal axis;
  (b) workpiece holding means mounted in said frame for rotation about said axis and adapted to support and to be non-rotatably connected to a crankshaft centered on said axis;
  (c) a tool carriage slidably mounted on said frame for a displacement which is transverse to said axis;
  (d) first drive means for imparting an angular rotation to said workpiece holding means about said axis;
  (e) second drive means for displacing said tool carriage in said transverse direction; and
  (f) control means having first and second separate but identical controllers for independently controlling said first and second drive means respectively such that said angular rotation and transverse displacement are each performed in a predetermined nonlinear relationship in response to independent control signals applied via a pair of mutually non-interactive drive channels, each channel including one of said first and second controllers.

6. A control system for a machine tool for machining crankshafts, which machine tool comprises:
  a frame having a fixed longitudinal axis; workpiece holding means mounted in said frame for rotation about said axis and adapted to support and to be non-rotatably connected to a crankshaft centered on said axis; a tool carriage slidably mounted on said frame for a displacement in a direction which is transverse to said axis; first drive means for imparting an angular rotation to said workpiece holding means about said axis; second drive means for displacing said tool carriage in said transverse direction;
  said control system being adapted to control said first and second drive means so that said angular rotation and said transverse displacement are performed with a predetermined, generally nonlinear relationship to each other, and comprising:
  (a) a first controller operatively connected to said first drive means for imparting a desired angular rotation to said workpiece holding means;
  (b) a second controller operatively connected to said second drive means for imparting a desired transverse displacement to said tool carriage;
  (c) drive control computer means for processing workpiece and tool data and for computing from said data a plurality of points of inflection and characteristic values defining a series of linear approximations of said generally nonlinear relationship, and for generating approximation data representing said approximations; and
  (d) interpolating means operable to receive said approximation data and to apply independently controlled angular rotation and transverse displacement reference inputs to both said controllers in dependence on said approximation data and thus to control said angular rotation and said transverse displacement in accordance with said approximations.

7. A control system as set forth in claim 6, in which said first controller is operated responsive to independently controlled rotation data and said second controller is operated responsive to independently controlled displacement data;
  said drive control computer means and said interpolating means are combined in a central computer having a fixed program and operable at a clock frequency determined by said program, and in accordance with said program delivers said reference inputs, each of which consists of mutually non-interactive sets of direction signals and a set of control pulses, said set of control pulses are related to each other in accordance with successive factors of proportionality for said series of linear approximations; and said first and second controllers are arranged in mutually non-interactive drive channels to receive said mutually non-interactive direction signals and control pulses and to control said first and second drive means so that said angular rotation and transverse displacement are effected in the directions indicated by said direction signals and with successive factors of proportionality determined by said control pulses.

* * * * *